United States Patent
Shetty et al.

(10) Patent No.: US 11,467,915 B2
(45) Date of Patent: Oct. 11, 2022

(54) SYSTEM AND METHOD FOR BACKUP SCHEDULING USING PREDICTION MODELS

(71) Applicant: EMC IP Holding Company LLC, Hopkinton, MA (US)

(72) Inventors: Sujan Kumar Shetty, Udupi (IN); Prasanth Balasubramanian, Bengaluru (IN); Sushanth Shet, Bengaluru (IN); Shelesh Chopra, Bangalore (IN); Jaishree Balasubramanian, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 111 days.

(21) Appl. No.: 16/656,834

(22) Filed: Oct. 18, 2019

(65) Prior Publication Data

US 2021/0117277 A1    Apr. 22, 2021

(51) Int. Cl.
*G06F 11/14* (2006.01)
*G06F 9/50* (2006.01)

(52) U.S. Cl.
CPC .......... *G06F 11/1461* (2013.01); *G06F 9/505* (2013.01); *G06F 11/1448* (2013.01); *G06F 11/1464* (2013.01)

(58) Field of Classification Search
CPC ............. G06F 11/1461; G06F 11/1448; G06F 11/1464
USPC ......................................................... 707/654
See application file for complete search history.

(56) References Cited

U.S. PATENT DOCUMENTS

| | | |
|---|---|---|
| 6,745,210 B1 | 6/2004 | Scanlan et al. |
| 8,429,359 B1 * | 4/2013 | Desai .................. G06F 11/1461 |
| | | 711/E12.103 |
| 8,554,918 B1 | 10/2013 | Douglis |
| 9,798,629 B1 * | 10/2017 | Shilane ............... G06F 11/1464 |
| 9,977,704 B1 | 5/2018 | Chopra et al. |
| 10,089,144 B1 * | 10/2018 | Nagpal ................. G06F 9/5027 |
| 10,102,080 B1 | 10/2018 | Gruszka et al. |
| 10,616,127 B1 | 4/2020 | Suit |
| 2007/0136541 A1 | 6/2007 | Herz et al. |
| 2009/0271485 A1 | 10/2009 | Sawyer |
| 2013/0085995 A1 | 4/2013 | Mostachetti et al. |
| 2014/0279912 A1 | 9/2014 | Anglin |
| 2014/0279922 A1 * | 9/2014 | Kottomtharayil ....... G06F 9/505 |
| | | 707/654 |
| 2015/0096011 A1 | 4/2015 | Watt |
| 2016/0217384 A1 * | 7/2016 | Leonard .................. G06N 5/02 |
| 2016/0306564 A1 | 10/2016 | Cheng et al. |
| 2016/0342403 A1 | 11/2016 | Zamir |
| 2017/0010941 A1 | 1/2017 | Shimada |

(Continued)

*Primary Examiner* — Eddy Cheung
(74) *Attorney, Agent, or Firm* — Chamberlain, Hrdlicka, White, Williams & Aughtry

(57) ABSTRACT

A backup manager for providing backup services includes storage and a backup orchestrator. The persistent storage stores prediction models. The backup orchestrator obtains a computing resource availability for a client; generates a prediction model of the prediction models using the computing resource availability for the client; predicts, using the prediction model and live data, a future computing resource availability for the client; and initiates generation of a backup for the client at an unscheduled time that is based, at least in part, on the future computing resource availability.

17 Claims, 8 Drawing Sheets

(56) References Cited

U.S. PATENT DOCUMENTS

| | | |
|---|---|---|
| 2017/0075765 A1 | 3/2017 | Chen |
| 2017/0132089 A1 | 5/2017 | Roehrsheim et al. |
| 2017/0300505 A1* | 10/2017 | Belmanu Sadananda ................... G06F 16/1756 |
| 2017/0357550 A1 | 12/2017 | Jain |
| 2017/0364415 A1 | 12/2017 | Formato et al. |
| 2018/0095816 A1* | 4/2018 | Fang ..................... G06F 11/076 |
| 2018/0314457 A1 | 11/2018 | Bender et al. |
| 2019/0278661 A1 | 9/2019 | Mehta et al. |
| 2019/0278663 A1 | 9/2019 | Mehta et al. |
| 2020/0019319 A1 | 1/2020 | Cheng et al. |
| 2020/0019470 A1 | 1/2020 | Wolfson et al. |
| 2020/0034718 A1* | 1/2020 | Beedu ...................... G06N 5/02 |
| 2020/0264919 A1 | 8/2020 | Vukovic |
| 2020/0334199 A1* | 10/2020 | Wolfson .............. G06F 11/1448 |
| 2020/0364112 A1 | 11/2020 | Mehta et al. |
| 2020/0387321 A1 | 12/2020 | Bansal et al. |
| 2021/0034571 A1* | 2/2021 | Bedadala ................ G06F 16/27 |

* cited by examiner

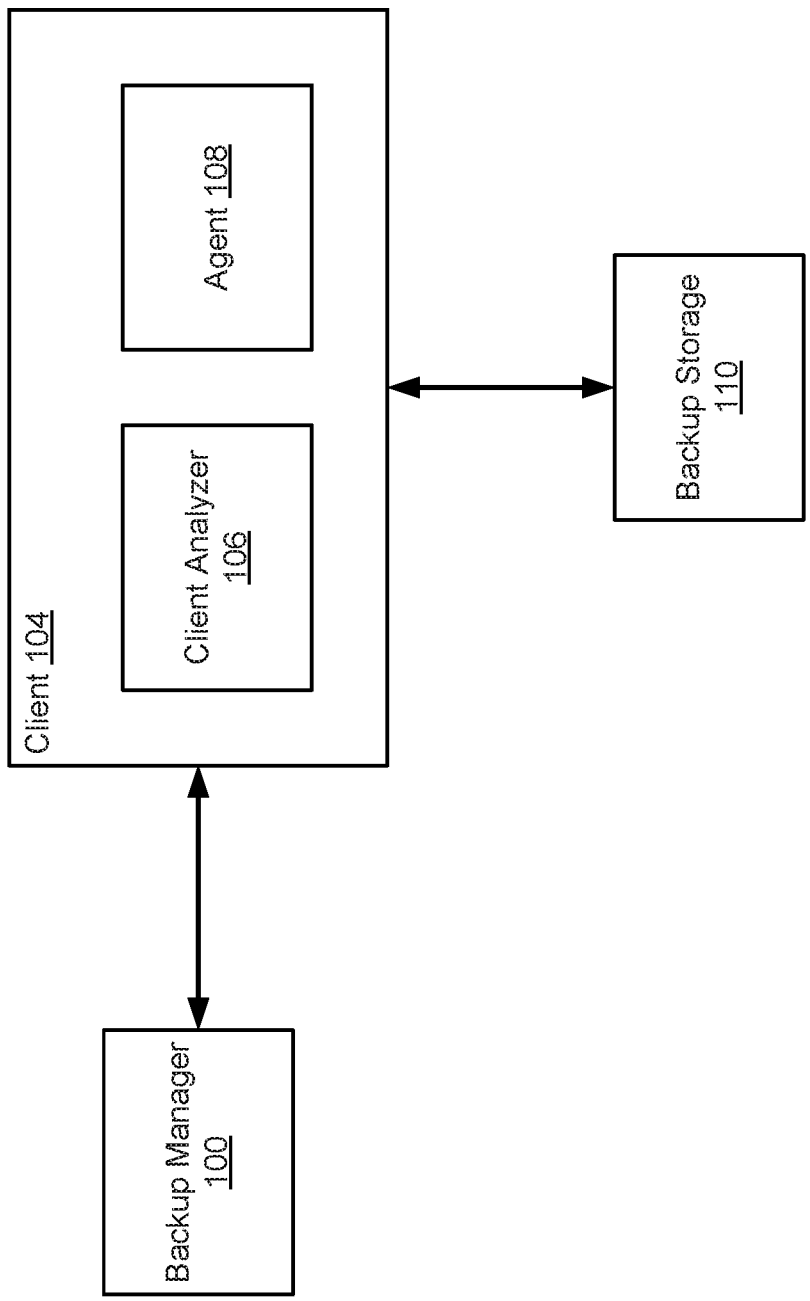
FIG. 1.1

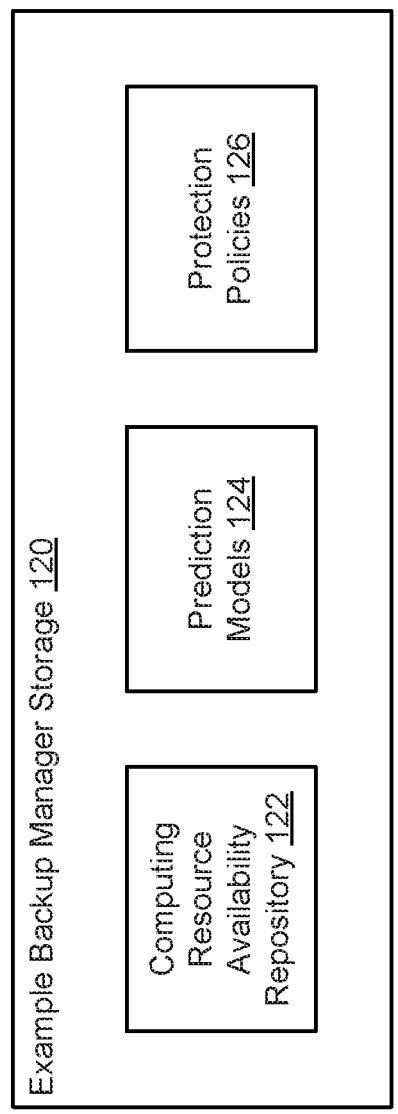
FIG. 1.2

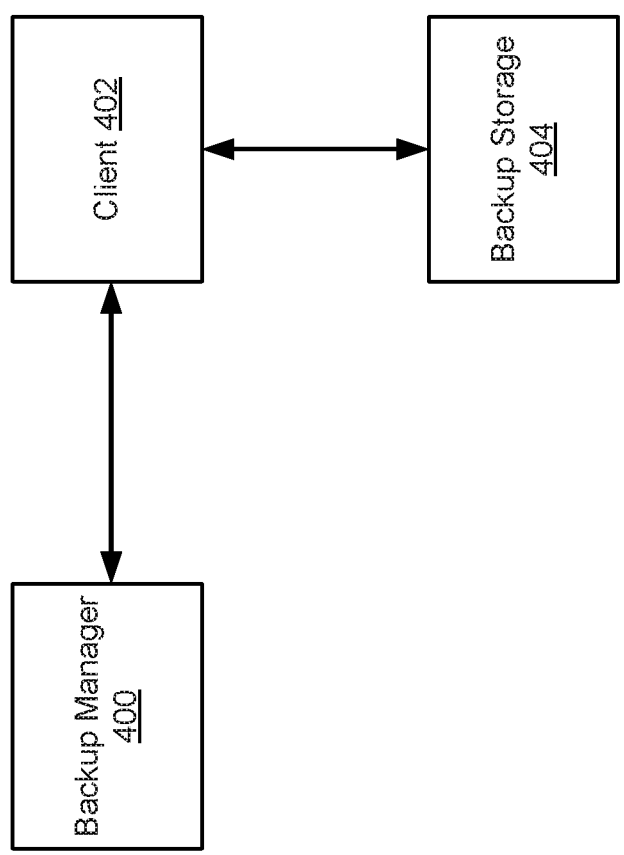
FIG. 4.1

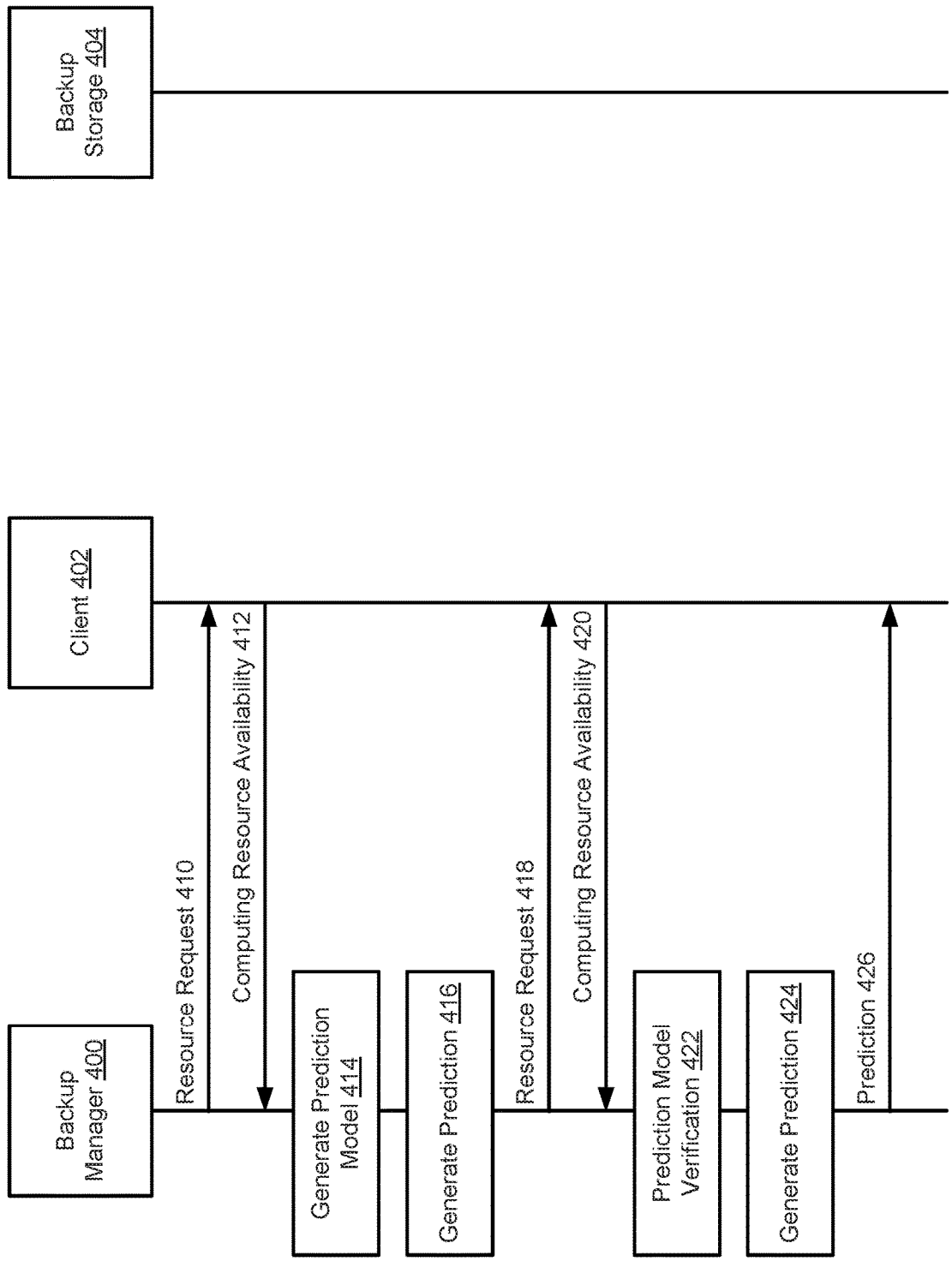
FIG. 4.2

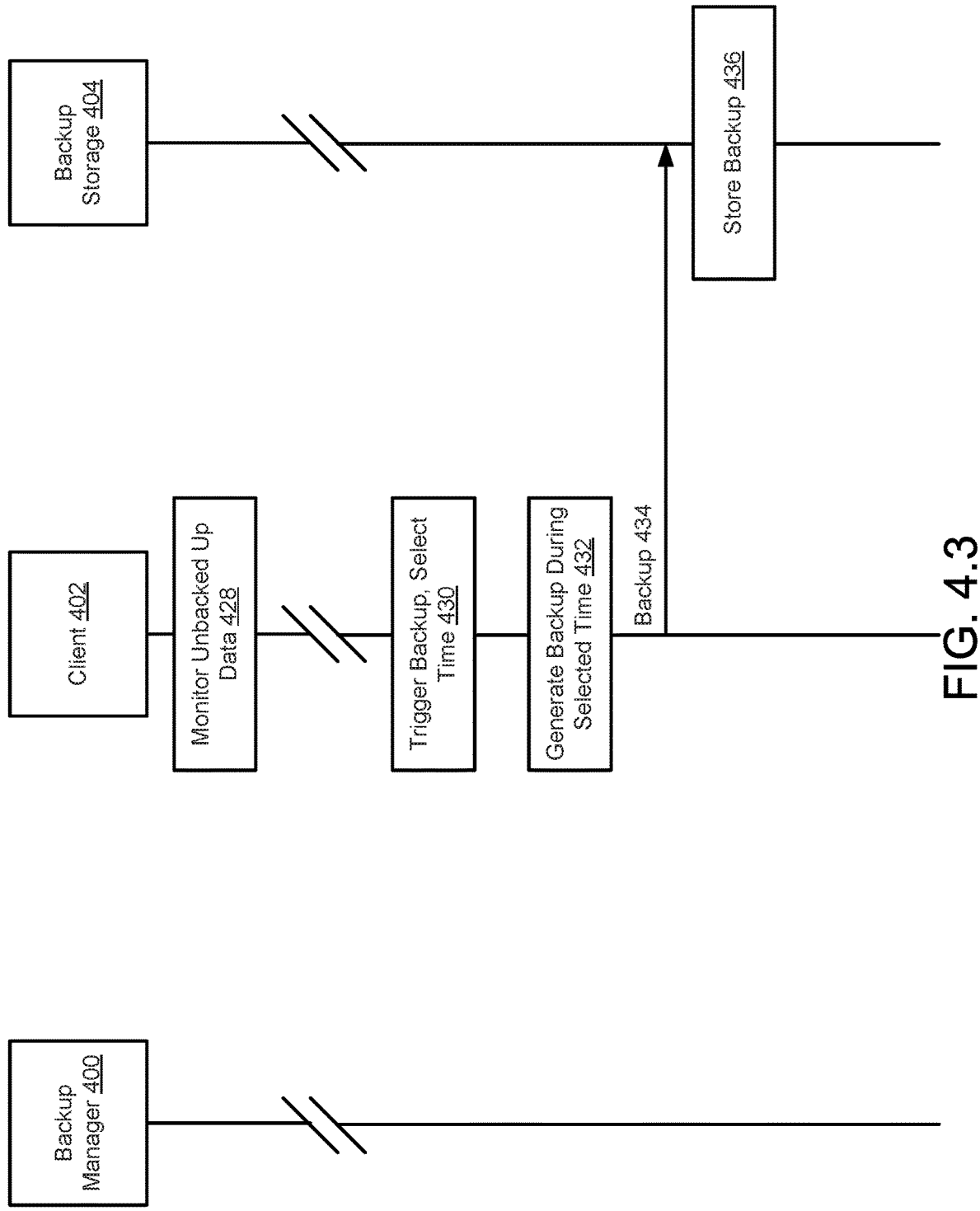
FIG. 4.3

SYSTEM AND METHOD FOR BACKUP SCHEDULING USING PREDICTION MODELS

BACKGROUND

Devices may generate information based on existing information. For example, devices may obtain information and derive information based on the obtained information. Once information is derived or obtained, the information may be stored as part of data for future use. If the data is lost, the information may be unavailable for future use.

SUMMARY

In one aspect, a backup manager for providing backup services in accordance with one or more embodiments of the invention includes storage and a backup orchestrator. The storage stores prediction models. The backup orchestrator obtains a computing resource availability for a client; generates a prediction model of the prediction models using the computing resource availability for the client; predicts, using the prediction model and live data, a future computing resource availability for the client; and initiates generation of a backup for the client at an unscheduled time that is based, at least in part, on the future computing resource availability.

In one aspect, a method for providing backup services in accordance with one or more embodiments of the invention includes obtaining a computing resource availability for a client; generating a prediction model using the computing resource availability for the client; predicting, using the prediction model and live data, a future computing resource availability for the client; and initiating generation of a backup for the client at an unscheduled time that is based, at least in part, on the future computing resource availability.

In one aspect, a non-transitory computer readable medium in accordance with one or more embodiments of the invention includes computer readable program code, which when executed by a computer processor enables the computer processor to perform a method for providing backup services, the method includes obtaining a computing resource availability for a client; generating a prediction model using the computing resource availability for the client; predicting, using the prediction model and live data, a future computing resource availability for the client; and initiating generation of a backup for the client at an unscheduled time that is based, at least in part, on the future computing resource availability.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an example backup manager storage in accordance with one or more embodiments of the invention.

FIG. 4.1 shows a diagram of an example system.

FIGS. 4.2-4.3 show diagrams of interactions between and actions performed by components of the example system of FIG. 4.1 over time.

DETAILED DESCRIPTION

Figure 2:
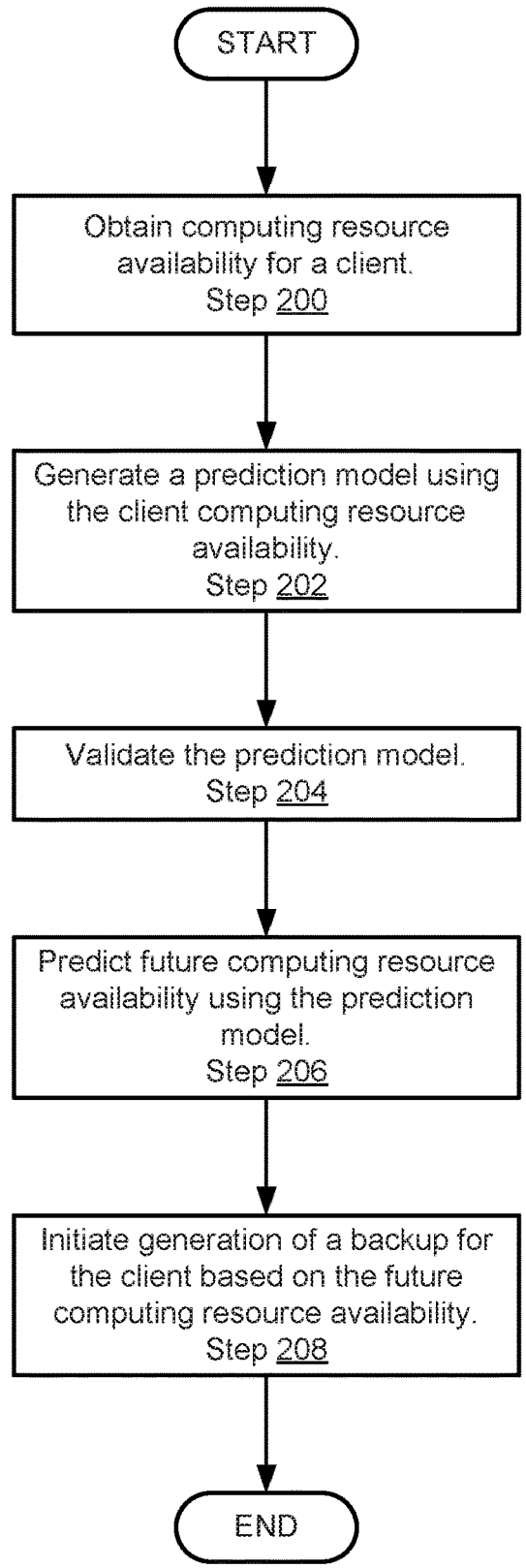
FIG. 2 shows a flowchart of a first method of providing backup services in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing backup services to clients and/or other types of devices. Backup services may include generating backups of the clients, storing the backups, and using the backups to restore clients to previous states.

Embodiments of the invention may provide a method for generating and storing unscheduled backups. A backup may be a data structure that may be used to restore an entity. An unscheduled backup may be a backup that is generated at a time that is not known in advance. Restoring the entity using backup that are generated in accordance with a schedule and/or at unscheduled points in time may place the entity in a previous operational state.

To generate backups, one or more embodiments of the invention may provide a system that generates backups at unscheduled times (e.g., unscheduled backups). In other words, the point in time at which a backup is generated may not be known ahead of the point in time (e.g., in accordance with a schedule) at which the backup is generated. For example, the point in time may be based on an amount of data of an entity that is in an unbacked up state. Because the amount of data of the entity that is in an unbacked up state may unpredictably change over time, the point in time at which a backup is to be generated for the client may be unknown ahead of the point in time. By generating unscheduled backups, rather than scheduled backups, embodiments of the invention may decrease the computational cost for generating backups by generating backups when needed. Doing so may prevent generation of backups that only backup small amounts of data while incurring a large computational cost for generation of the backups.

In one or more embodiments of the invention, the system generates unscheduled backups at points in time during which the generation of the unscheduled backups is unlikely to negatively impact the ability of the entities that generate the backups to provide other services while generating the backups. Due to the computational cost of generating backups, generating backups by an entity may place a large computational load on the entity which reduces that ability of the entity to provide other services while generating the backup. The system may generate predictions, based on past behaviors of the entities for which backups are to be generated, of future periods of time during which the clients will likely have sufficient computational resources available to both generate backups and continue to provide other services without negatively impacting the quality of services provided. The predictions may be used to select points in time to generate unscheduled backup so the unscheduled backups may be generated without degrading the quality of other services provided by the entities that generate the backups.

FIG. 1.1 shows a system in accordance with one or more embodiments of the invention. The system may include a client (104) that utilizes backup services provided by the backup manager (100). The backup services may include (i) generation of backups of the client (104), storing the backups (102) in a backup storage (110), and/or utilizing backups of the client (104) stored in the backup storage (110) to restore the client (104). Restoring the client (104) may place the state of the client (104) into a state associated with the backups used to perform the restoration.

For example, backups of the client (104) may include data reflecting the state of the client (104) at a point of time (e.g., a full backup) and/or changes in the state of the client (104) over a period of time (e.g., an incremental backup). The backups may be used to change the data of the client (104) to reflect the data of the repository at periods of time associated with backups. Once changed, the state of the client (104) may be similar to the state of the deployment when the backups were generated.

The backup manager (100) may orchestrate generation of backups of the client (104) at unscheduled points in time. For example, rather than having a schedule that specifies when backups of the client (104) are to be generated (e.g., at 1:00 PM, 3:00 PM, 7:00 PM, etc.), the backup manager (100) may trigger generation of backups at points in time that are not selected in accordance with a schedule. Rather, the backup manager (100) may orchestrate generation of backups (i) as the quantity of unbacked up data of the client (104) reaches a predetermined amount and (ii) after reaching the predetermined amount of data, at a point in time during which the backup manager (100) predicts that the client (104) will have sufficient available computing resources to generate the backup without impacting other services provided by the client (104).

By doing so, the system illustrated in FIG. 1.1 reduce the likelihood that backup generation will impact the ability of the client (104) to provide its services while still meeting data protection goals. Consequently, a user experience (e.g., a user of the services provided by the client) may be improved by reducing and/or eliminating phantom slow downs that may occur due to the limited amount of computing resources available to the client (104) to provide its services while also generating backups.

Each of the components of the system may be operably connected to each other and/or other entities not shown using any combination and quantity of wired and/or wireless networks. Each component of the system is discussed below.

The client (104) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-3. The client (104) may be implemented using other types of computing devices without departing from the invention. For additional details regarding computing devices, refer to FIG. 5.

The client (104) may be implemented using logical devices without departing from the invention. For example, the client (104) may be implemented using virtual machines that utilize computing resources of any number of physical computing devices to provide the functionality of the client (104). The client (104) may be implemented using other types of logical devices without departing from the invention.

In one or more embodiments of the invention, the client (104) provides computer implemented services. A computer implemented service may be, for example, managing a database, serving files, or providing other types of services that may be utilized by users.

When providing computer implemented services, the client (104) may generate and store data which the client (104) utilizes to provide the computer implemented services. For example, to provide database services, the client (104) may store information from a user in a database. The user may desire access to the information in the future. Consequently, the future availability of the data stored in the data may be valuable to the client (104).

To improve the likelihood that such data is available in the future, the client (104) may utilize backup services provided by the backup manager (100). As discussed above, the backup services provided by the backup manager (100) may include orchestration of backup generation and storage of backups in the backup storage (110).

To assist the backup manager (100) in providing backup services, the client (104) may host a client analyzer (106) and an agent (108). Each of these components are discussed below.

The client analyzer (106) may obtain information from the client (104) that the backup manager (100) may use to generate predictions regarding when the client (104) will be likely to have sufficient computing resources available to continue to provide its functionality while also generate a backup. To obtain information, the client analyzer (106) may monitor the availability of computing resources (e.g., processing resources such as processor cycles, memory resources such as a quantity of available memory, etc.) of the client (104). The client (104) may compare the aforementioned computing resources to thresholds and identify periods of time during which the computing resources exceed the thresholds. The client analyzer (106) may report the identified time period as computing resource availability to the backup manager.

For example, the client analyzer (106) may use thresholds of 80% of the total resources of the client. Whenever each of the available computing resources of the client analyzer (106) meet this threshold level, the corresponding period of time may be provided to the backup manager (100) to indicate that the client (104) had sufficient computing resources available during the corresponding time period to both provide its services and generate a backup without impacting the ability of the client (104) to provide its other services. Other thresholds may be used without departing from the invention. For example, different threshold may be used for each type of computing resource.

The threshold level for each type of computing resource may be based on, for example, a protection policy that specifies the maximum amount of unbacked up data for the client. For example, as the maximum amount of unbacked up data increases, the quantity of computing resources needed to generate a backup may increase.

In some embodiments of the invention, the client analyzer (106) may also filter the identified time periods based on a minimum time period duration. For example, time periods that are too short to generate a backup may not be reported to the backup manager (100).

The client analyzer (106) may be implemented using a logical entity. For example, the client analyzer (106) may be implemented using computer instruction stored in persistent storage that when executed by a processor of the client gives rise to the client analyzer (106). The client analyzer (106) may be implanted using a physical device. For example, the client analyzer (106) may be implemented using an integrated circuit having circuitry adapted to provide the functionality of the client analyzer (106).

The agent (108) may orchestrate generation of backups of the client (104). To do so, the agent (108) may obtain future computing resource availability predictions from the backup manager (100), monitor the quantity of unbacked up data of the client based on a protection policy, and/or generate a backup for the client at a point of time when the future computing resource availability predictions indicates that the client (104) will have sufficient computing resources. The agent (108) may generate a backup of the client when the amount of unbacked up data exceeds a limit specified by the protection policy.

While the client (104) is illustrated in FIG. 1.1 as including a client analyzer (106) and an agent (108), the client (104) may include additional, fewer, and/or different components from those discussed above without departing from the invention.

The backup manager (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-3. The backup manager (100) may be implemented using other types of computing devices without departing from the invention. For additional details regarding computing devices, refer to FIG. 5.

The backup manager (100) may be implemented using logical devices without departing from the invention. For example, the backup manager (100) may be implemented using virtual machines that utilize computing resources of any number of physical computing devices to provide the functionality of the backup manager (100). The backup manager (100) may be implemented using other types of logical devices without departing from the invention.

In one or more embodiments of the invention, the backup manager (100) provides backup services to the client (104) and/or other entities. Providing backup services may include (i) obtaining computing resources availability information from the client (104), (ii) training a prediction model using the computing resource availability information, (iii) verifying an accuracy of predictions generated using the prediction model, (iv) using the generated model to generation predictions of when the client (104) will have sufficient available computing resources in the future, and (v) initiating generation of an unscheduled backup of the client (104) at a point in time based on a predictions.

When generating backups for the client (104), the backup manager (100) may generate a prediction model. A prediction model may be a data structure that may be used to make a prediction (e.g., future computing resource availability of a client). The prediction model may be, for example, a machine learning model. The prediction model may be a time series forecasting model. The time series forecasting model may use the long short-term memory algorithm. Other types of prediction models may be used without departing from the invention. The machine learning model may be trained using the computing resource availability of the client. To generate predictions, the machine learning model may operate on (e.g., ingest) new computing resource availability data from the client and generate predictions as output.

The prediction model and/or other data used by the agent may be stored in storage. For additional details regarding data structures stored in storage, refer to FIG. 1.2.

To provide its functionality, the backup manager (100) may include an orchestrator (e.g., a backup orchestrator) that provides the above noted functionality of the backup manager and/or includes functionality to send messages to entities hosted by the client (104) to invoke functionality of the entities (e.g., client analyzer, agent). For example, the client (104) may host a remote agent (not shown) that services requests from the backup manager (100). The agent may, upon receipt of such requests, invoke functionality of the client (104).

The backup orchestrator may be implemented using physical devices (e.g., processors, application specific integrated circuits, programmable gate arrays, etc.) and/or logical devices (e.g., computer instructions stored on persistent storage that when executed by a processor gives rise to the functionality of the backup orchestrator).

The backup storage (110) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-3. The backup storage (110) may be implemented using other types of computing devices without departing from the invention. For additional details regarding computing devices, refer to FIG. 5.

The backup storage (110) may be implemented using logical devices without departing from the invention. For example, the backup storage (110) may be implemented using virtual machines that utilize computing resources of any number of physical computing devices to provide the functionality of the backup storage (110). The backup storage (110) may be implemented using other types of logical devices without departing from the invention.

In one or more embodiments of the invention, the backup storage (110) provides data storage services to the client (104) and/or other entities. Data storage services may include storing data and providing copies of previously stored data. For example, backups of the client (104) and/or other entities may be stored in the backup storage (110) for storage. For additional details regarding storing data in the backup storage (110), refer to FIG. 1.3.

While the system of FIG. 1.1 has been illustrated as including a limited number of specific components, a system in accordance with embodiments of the invention may include additional, fewer, and/or different components without departing from the invention. For example, the system may include any number of clients (104), backup managers (100), backup storages (110), and/or other entities without departing from the invention. Any of the aforementioned components may cooperate to provide the above noted and later described functionality of the system of FIG. 1.1.

As discussed above, the backup manager (100) may store data that may be used when providing its functionality (e.g., services). To further clarify aspects of stored data, diagrams of an example storage of the backup manager (100) is illustrated in FIG. 1.2.

Turning to FIG. 1.2, FIG. 1.2 shows a diagram of an example backup manager storage (120) in accordance with embodiments of the invention.

In one or more embodiments of the invention, the example backup manager storage (120) is implemented using devices that provide data storage services (e.g., storing data and providing copies of previously stored data). The devices that provide data storage services may include hardware devices and/or logical devices. For example, the example backup manager storage (120) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, the example backup manager storage (120) may include a memory device (e.g., a dual in line memory device) in which data is stored and from which copies of previously stored data are provided. In another example, the example backup manager storage (120) may include a persistent storage device (e.g., a solid state disk drive) in which data is stored and from which copies of previously stored data is provided. In a still further example, the example backup manager storage (120) may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

The example backup manager storage (120) may store data structures including a computing resource availability repository (122), prediction models (124), and protection policies (126). Each of these data structures is discussed below.

The computing resource availability repository (122) may be a data structure that includes information regarding the availability of computing resources of the client (104, FIG. 1.1) over time. As discussed above, the client analyzer (hosted by the client) may send information regarding its available computing resources to the backup manager over time. In turn, the backup manager may store the information in the computing resource availability repository (122).

The information included in the computing resource availability repository (122) may enable past durations of time during which the client (104, FIG. 1.1) has sufficient computing resources available to generate a backup to be identified. The information may specify the past durations of time directly (e.g., specify times) or indirectly (e.g., specify the availability of computing resources of the client over time).

The prediction models (124) may be one or more data structures including information used to generate predictions. The contents of the prediction models (124) may vary depending on the algorithm used to generate the prediction models (124). For example, different algorithms for generating predictions models (e.g., machine learning models) may generate different types of data structures (e.g., trained models) that may be used to generate predictions. Separate models may be generated for each entity for which predictions are generated using the prediction models (124). By doing so, predictions customized for each entity may be generated.

In one or more embodiments of the invention, the prediction models (124) are used in combination with a corresponding algorithm to generate a functional relationship between an input and a desired output. The input, for example, may be the information included in the computing resource availability repository (122) (or a portion of the information, e.g., information associated with a particular client). The output may be future computing resource availabilities of the client (e.g., future periods of time when the client will likely have sufficient computing resources to generate predictions).

Generating the prediction models (124) may be referred to as training. When training, a training data set (e.g., past behavior) may be ingested by a corresponding algorithm that produces one of the prediction models (124). To use the prediction models (124), the corresponding algorithm may take, as input, a new data (e.g., live data) and generate a prediction based on the new data. Consequently, once the prediction model is generated using training data, new data may be used to generate predictions using the trained prediction model.

The protection policies (126) may be a data structure that includes information regarding goals for data protection of entities. The goals may specify the amount, type, and/or quality of data protection services to be provided to respective entities. The protection policies (126) may specify, for example, a level of redundancy for backups, a retention time for backups, and/or other characteristics that specify the level of data protection to be provided to entities. Additionally, the protection policies (126) may specify the maximum amount of unbacked up data may be stored before a backup must be performed.

For example, with respect to FIG. 1.1, the protection policies (126) may include a policy associated with the client. The protection policy may specify an amount of data (e.g., 20 Gigabytes or another quantity of data) that may be unbacked up before a backup of the client must be (or should be) generated. As the client operates, the amount of unbacked up data may grow until it exceeds the maximum amount of unbacked up data specified by the data protection policy. As discussed above, reaching the aforementioned amount may trigger an agent hosted by the client to initiate generation of a backup of the client.

While the example backup manager storage (120) has been illustrated as including data structures including a limited amount of specific information, any of the data structures stored in the example backup manager storage (120) may include addition, less, and/or different information without departing from embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

Figure 3:
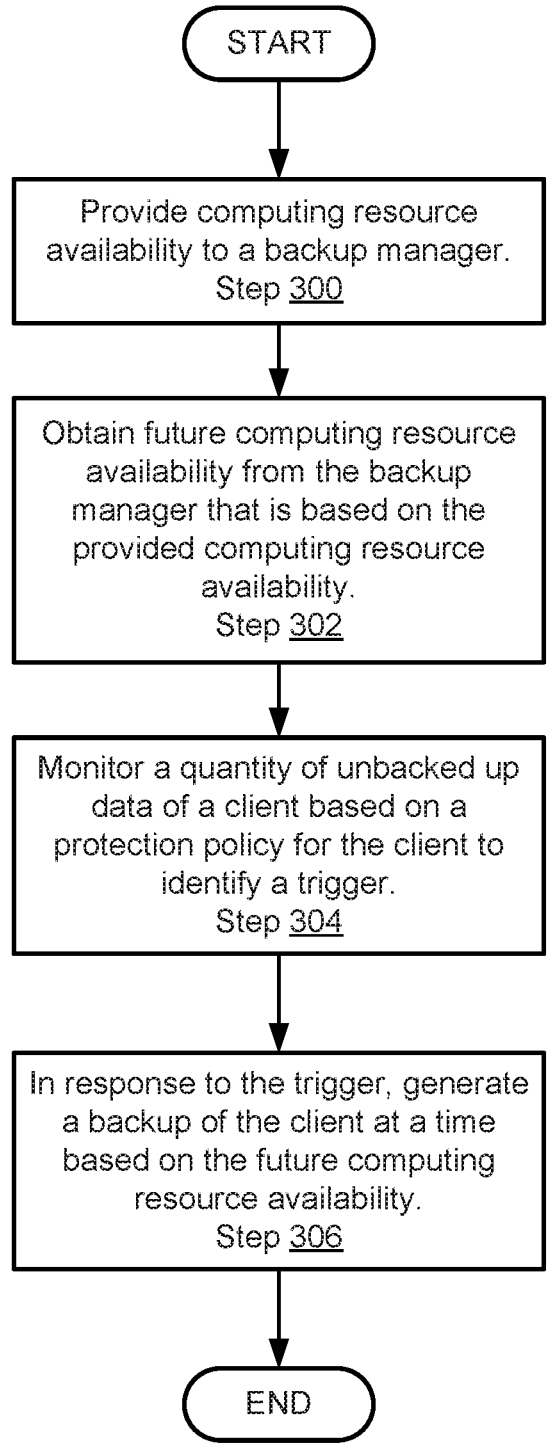
FIG. 3 shows a flowchart of a second method of providing backup services in accordance with one or more embodiments of the invention.

As discussed above, a backup manager in accordance with embodiments of the invention may provide backup services. FIGS. 2-3 show methods that may be performed by a backup manager, a client, or another entity when providing backup services.

FIG. 2 shows a flowchart of a method in accordance with one or more embodiments of the invention. The method depicted in FIG. 2 may be used to provide backup generation services in accordance with one or more embodiments of the invention. The method shown in FIG. 2 may be performed by, for example, a backup manager (e.g., 100, FIG. 1.1). Other components of the system in FIG. 1.1 may perform all, or a portion, of the method of FIG. 2 without departing from the invention.

While FIG. 2 is illustrated as a series of steps, any of the steps may be omitted, performed in a different order, additional steps may be included, and/or any or all of the steps may be performed in a parallel and/or partially overlapping manner without departing from the invention.

In step 200, the computing resource availability for a client is obtained.

In one or more embodiments of the invention, the computing resource availability is obtained by invoking the functionality of a client analyzer hosted by the client. The client analyzer may monitor the computing resource availability of the client over time and provide such information to the backup manager.

The computing resource availability may specify periods of time during which the client had sufficient computing resources available to generate a backup while providing its other services. To identify the periods of time, thresholds that specify a quantity of available computing resources may be used to identify the periods of time (e.g., compare the available computing resources to the thresholds).

The periods of time may also be identified by comparing a duration of each period of time meeting the computing resource thresholds to a duration threshold. In other words, each of the periods of time meeting the computing resources thresholds that are of duration below that of the threshold (e.g., a time threshold) may be excluded from the computing resource availability.

The client analyzer may provide the computing resource availability after its functionality is invoked. The client analyzer may also, or alternatively to merely reporting periods of time as the computing resource availability, provide the actual available computing resources of the client.

In step 202, a prediction model is generated using the client computing resource availability. The prediction model may be generated by running a machine learning (or other type of prediction algorithm) and using the computing resource availability as training data. The output of the algorithm may be the prediction model.

In step 204, the prediction model is validated. The prediction model may be validated by generating predictions using the prediction model. Live data (e.g., additional computing resource availability of the client) for a period of time of the generated predictions. The predictions may then be compared to the live data to determine whether the prediction model is valid. The comparison may be made using, for example, statistical analysis tools or other methods.

If the prediction model is found to be inaccurate, the live data may be used in combination with the computing resource availability of step 200 to generate another prediction model. For example, both the computing resource availability and the live data may be used as input to the machine learning algorithm resulting in the generation of an additional prediction model. The aforementioned process may be repeated until the prediction model is validated.

In step 206, future computing resource availability is predicted using the prediction model. In other words, the prediction model of steps 202 and 204 may be used to generate a prediction that specifies periods of time in the future when the client will have sufficient computing resources available to generate a backup while providing its other services.

In step 208, generation of a backup for the client is initiated based on the future computing resource availability.

In one or more embodiments of the invention, the backup generation is initiated by providing the future computing resource availability to an agent hosted by the client. The agent may use the future computing resource availability to select a point in time to generate an unscheduled backup. For additional details regarding how the agent selects the point in time, refer to FIG. 3.

Initiating generating of the backup for the client may cause the backup to be generated at an unscheduled point in time in the future. For example, the point in time in the future may be based on the amount of unbacked up data of the client (that may unpredictably change over time) and protection policies that may specify a maximum amount of unbacked up data that the client may store before a backup may be generated. When the amount of unbacked up data reaches the specified maximum amount, a point in time for generation of the backup may be selected using the future computing resource availability.

For example, the first point in time that the future computing resource availability indicates the client will have sufficient computing resources to generate the backup and that is also past the point in time at which the amount of unbacked up data reaches the specified maximum amount may be used as the point in time to generate the unscheduled backup.

The method may end following step 208.

Using the method illustrated in FIG. 2, a system in accordance with embodiments of the invention may generate unscheduled backups without negatively impacting other services provided by a client.

Turning to FIG. 3, FIG. 3 shows a flowchart of a method in accordance with one or more embodiments of the invention. The method depicted in FIG. 3 may be used to coordinate backup generation in accordance with one or more embodiments of the invention. The method shown in FIG. 3 may be performed by, for example, a client analyzer and/or an agent hosted by a client (e.g., 104, FIG. 1.1). Other components of the system in FIG. 1.1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, computing resource availability for a client is provided to a backup manager. The computing resource availability may specify any number of periods of time during which the client had sufficient computing resources to generate a backup.

The computing resource availability may be generated by monitoring the available computing resources of the client over time. The availability computing resources of the client may be compared to thresholds that specify an amount of one or more of the computing resources that must be available to for the client to generate a backup without impacting its ability to provide its other services. The an initial set of periods of time (e.g., durations of time) may then be determined based on durations of time during which the available computing resources exceeded the thresholds.

Once the initial set of periods of time are obtain, the durations of each period of time of the initial set of periods of time may be compared to a threshold that specifies a minimum period of time. The minimum period of time may be based on how long it will take for a backup of the client to be generated. Any of the periods of time of the initial set of the periods of time that exceed the time duration threshold may be used as the computing resource availability.

The computing resource availability may also or alternatively to the periods of time specify the actual available computing resources of the client over time. For example, the computing resource availability may specify by the periods of time and the available computing resources of the client both during the periods and over the time period during which the computing resource availability of the client was monitored to identify the periods of time.

In step 302, a future computing resource availability is obtained from the backup manager. The future computing resource availability may be based on the computing resource availability provided to the backup manager in step 300.

The future computing resource availability may specify periods of time in the future. The specified periods of time may be provided as predictions of when the client will likely have sufficient computing resources for generating a backup without impacting the other services provided by the client. The future periods of time may each be of any duration, occur at any time (e.g., over the next day, week, month, year, etc.), and there may be any number of such periods of time.

In step 304, a quantity of unbacked up data of the client is monitored based on a protection policy for the client to identify a trigger. As discussed above, a protection policy associated with the client may specify a maximum allowable quantity of unbacked up data before a backup is to be generated. When the quantity of unbacked up data of the client exceeds this requirement of the protection policy, an unscheduled backup generation may be triggered. In other words, the point in time at which the backup is generation may not be done in accordance with a schedule. Rather, the unscheduled backup may be triggered based on the behavior (e.g., quantity of unbacked up date) of the client.

In step 306, in response to the trigger, a backup of the client is generated at a time based on the future computing resource availability.

In one or more embodiments of the invention, once the trigger occurs, a point in time for generating the unscheduled backup is selected to be during one of the periods of time specified by the future computing resource availability. For example, consider a scenario where the future computing resource availability specifies a first time period of 1:00 PM-2:00 PM and a trigger occurs at 12:30 PM. In response to the trigger, an unscheduled backup may be generated at 1:00 PM so that the unscheduled backup occurs after the trigger and during a period of time specified by the future computing resource availability.

Once generated, the backup may be stored in backup storage.

The method may end following step 306.

Using the method illustrated in FIG. 3, unscheduled backups may be generated during periods of time which are unlikely to result in degradation of services provided by the client. Consequently, a user experience for clients may be improved by reducing the likelihood of phantom slowdowns (e.g., slowdowns caused by backup generations that degrade the services provided by the client due to limited computing resources and that the cause of such slowdowns is unknown to users of the clients) from occurring.

To further clarify embodiments of the invention, a non-limiting example is provided in FIGS. 4.1-4.3. FIG. 4.1 may illustrate a system similar to that illustrated in FIG. 1.1. FIGS. 4.2-4.3 may illustrate interactions between components and/or actions performed by the components of the system of FIG. 4.1 over time. For the sake of brevity, only a limited number of components of the system of FIG. 1.1 are illustrated in each of FIGS. 4.1-4.3.

Example

Consider a scenario as illustrated in FIG. 4.1 in which a backup manager (400) is providing backup services to a client (402). When providing backup services, the backup manager (400) may orchestrate storage of backups in a backup storage (40).

Turning to FIGS. 4.2-4.3, the aforementioned figures illustrate interactions and actions between components of the system of FIG. 4.1. In these figures, the relative occurrence in time of the interactions progresses from the top of each figure (i.e., earlier in time) to the bottom of each figure (i.e., later in time). FIG. 4.3 is a continuation of the diagram of FIG. 4.2. In other words, element 410 indicates the first interaction that occurs in time while element 436 indicates the last interaction that occurs.

Turning to FIG. 4.2, at a first point in time, the backup manager (400) begins providing backup services for the client (402). To provide backup services to the client (402), the backup manager (400) needs to obtain information from the client (402) that that it may provide predictions with respect to the future computing resource availability of the client (402). By doing so, unscheduled backups for the client (402) may be generated using the predictions to avoid phantom slowdowns caused by generating the backups.

To obtain the information to generate the predictions, the backup manager (400) sends a resource request (410) to the client (402). The resource request (410) specifies that information regarding the past computing resource availability of the client (402) be provided. Prior to sending the resource request (410), the client (402), or more specifically a client analyzer (not shown) hosted by the client (402), may have been monitoring the computing resources of the client (402) to determine their availability over time.

In response to the resource request (410), the client (402) sends its computing resource availability (412) to the backup manager (400). The computing resource availability specifies that on weekdays from approximately 5:15-7:30 PM the client (402) has sufficient computing resources to generate backups without impacting its ability to provide other services.

In response to obtaining the computing resource availability (412), the backup manager (400) generates a prediction model (414). To do so, the backup manager (400) ingests the information included in the computing resource availability (412) using a machine learning model. The machine learning model generates the prediction model (414) using the computing resource availability (412).

After generating the prediction model (414), the backup manager (400) elects to test the prediction model (414) to verify that it generates accurate predictions. To do so, the backup manager (400) generates a prediction (416) for a future week. The generated prediction specifies that during the weekdays of the future week the client (402) will have sufficient computing resources for backup generation from 6:04 PM-7:18 PM.

To verify the accuracy of the generated prediction (416), the backup manager (400) sends a resource request (418) to the client (402). The resource request (418) specifies that information regarding the computing resource availability of the client (402) during the future week.

In response to the resource request (418), the client (402), more specifically the client analyzer hosted by the client (402), monitors the available computing resources of the client (402) during the future week and sends the computing resource availability (420) for the future week to the backup manager (400). The computing resource availability (420) for the future week specifies that on weekdays from approximately 4:40-8:15 PM the client (402) has sufficient computing resources to generate backups without impacting its ability to provide other services.

In response to obtaining the computing resource availability (420) for the future week, the backup manager (400) performs a prediction model verification (422) by comparing the prediction to the obtained computing resource availability (420) for the week. Because here the predicted periods of time are within the actual periods of time (i.e., 6:04-7:18 PM is within 4:40-8:15 PM), the prediction model verification (422) indicates that the predictions are accurate. Consequently, the backup manager (400) determines that the prediction model (414) generates accurate prediction.

However, had the prediction model been determined to not be accurate (e.g., some of the predictions falling outside of the times when the client had sufficient computing resource to generate backups), the backup manager (400) could have obtained more data (i.e., the computing resource availability (420) regarding the availability of computing resources of the client (402) and used all of the data (i.e., both of the computing resource availabilities (412, 420)) to generate a second prediction model. The same processes of verification and prediction model generation may be performed to generate progressively more accurate models until a sufficiently accurate model is generated.

Returning to the discussion of FIG. 4.2, after the prediction model is verified the backup manager (400) generate another prediction (424) that specifies that during the weekdays of the another future week the client (402) will have sufficient computing resources for backup generation from 6:15 PM-8:00 PM. After generating the prediction (424), the backup manager (400) provides the prediction (426) to the client (402). Once provided, an agent hosted by the client (402) that manages unscheduled backup generation may utilize the prediction.

Turning to FIG. 4.3, after the prediction is provided to the client (402), the client (402) monitors unbacked up data (428) for a period of time as indicated by the line breaks in the vertical lines of FIG. 4.3. During the period of time, progressively larger amounts of unbacked up data (428) may be generated by the client (402).

On a Monday at 4:45 PM, the amount of unbacked up data (428) reaches a quantity that causes the agent of the client (402) to trigger an unscheduled backup and select a time (430) for performing the unscheduled backup. The client (402) selects the time using the previously obtained prediction.

Specifically, the client selects Monday at 6:15 PM as the time to generate the backup. The client (402) makes the aforementioned selection because the prediction (e.g., a future computing resource availability prediction) marked as element 424 indicates that sufficient computing resources of the client (402) will next be available (i.e., after Monday at 4:45 PM) at 6:15 PM.

After selecting Monday at 6:15 PM, the client (402) waits until the aforementioned time to generate a backup for the client (402) during the selected time (432). In this example, the prediction turns out to be accurate (e.g., the client (402) had sufficient computing resources to generate the backup without impacting the other services that it provides). Once the backup is generated, the backup (434) is sent to backup storage (404) for storage.

Upon obtaining the backup (434), the backup storage (404) stores the backup (436) for future use.

End of Example

Thus, as illustrated in FIGS. 4.1-4.3, embodiments of the invention may provide a method for generating unscheduled backup in a manner that is unlikely to negatively impact the ability of an entity that generates the backups to provide other services while generating the unscheduled backups. Consequently, a user experience may be improved by reducing or eliminating the likelihood of phantom slowdowns from occurring which may be very frustrating to users of the entities.

Figure 5:
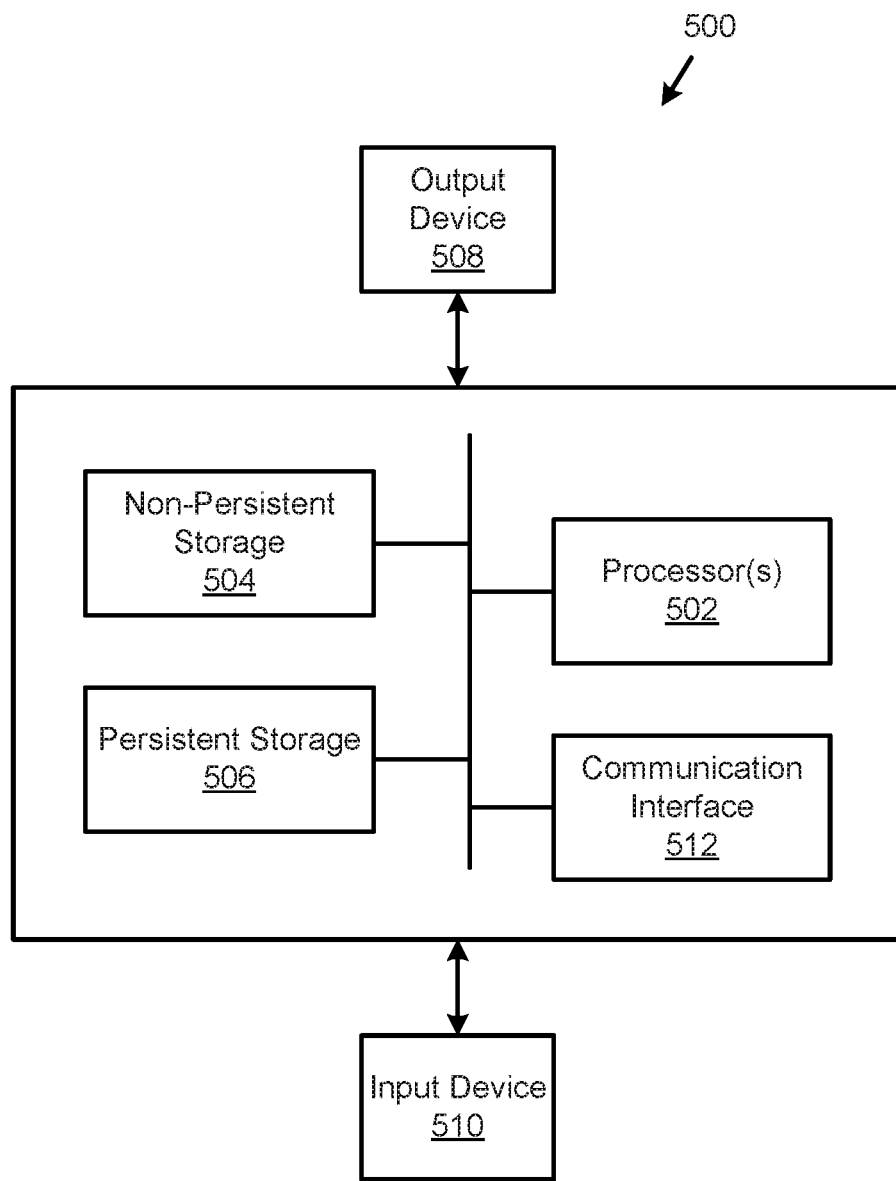
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a method for managing the generation of backups. To do so, embodiments of the invention may provide a system in which generation of unscheduled backups are unlikely to occur during periods of time in which the entities that generate the backups are unlikely to have sufficient computing resources available to generate backups without degrading the quality of other services provided by the entities. Due to the computational expense of backup generation, generation of backups may constrain the ability of entities to provide other functionalities while also generating the backups. Constraining the ability of the entities to provide their other services may degrade a user experience by causing phantom slowdowns, slow processing times, long wait times for resolution of actions, pauses of operation or other issues that appear to occur without cause to a user, and/or other impacts on a user that appear to be without cause and/or are undesirable.

To mitigate the aforementioned issues, a system in accordance with embodiments of the invention may proactively identify future periods of time in which it is likely that the entities will have sufficient computing resources available for to both generate generation and continue to provide other services (e.g., provide both concurrently) without constraining the ability of the entities to provide their other services. By doing so, embodiments of the invention may provide an improved user experience, more efficiently utilizes computing resources, and more effectively distributes computational workloads across a distributed system (e.g., identifying needs for unscheduled backups client side while generate predictions on a manager side).

Thus, embodiments of the invention may address the problem of limited computational resource availability for generating and storing backups in a distributed environment.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A backup manager for providing backup services, comprising:
   storage for storing prediction models; and
   a backup orchestrator programmed to:
      obtain a computing resource availability for a client;
      generate a prediction model of the prediction models using the computing resource availability for the client;
      predict, using the prediction model and live data, a future computing resource availability for the client; and
      initiate generation of a backup for the client at an unscheduled time that is based, at least in part, on the future computing resource availability,
      wherein the unscheduled time is further based, at least in part, on a quantity of unbacked up data of the client reaching a threshold.

2. The backup manager of claim 1, wherein the unscheduled time is further based, at least in part, on a protection policy associated with the client.

3. The backup manager of claim 1, wherein the computing resource availability for the client specifies periods of time during which available computing resources of the client exceed a second threshold.

4. The backup manager of claim 3, wherein the second threshold is based, in part, on a maximum quantity of unbacked up data that the client may store without violating a protection policy associated with the client.

5. The backup manager of claim 3, wherein each of the periods of time exceed a minimum period of time.

6. The backup manager of claim 1, wherein the future computing resource availability specifies future periods of time.

7. A method for providing backup services, comprising:
   obtaining a computing resource availability for a client;
   generating a prediction model using the computing resource availability for the client;
   predicting, using the prediction model and live data, a future computing resource availability for the client; and
   initiating generation of a backup for the client at an unscheduled time that is based, at least in part, on the future computing resource availability,
   wherein the unscheduled time is further based, at least in part, on a quantity of unbacked up data of the client reaching a threshold.

8. The method of claim 7, wherein the unscheduled time is further based, at least in part, on a protection policy associated with the client.

9. The method of claim 7, wherein the computing resource availability for the client specifies periods of time during which available computing resources of the client exceed a second threshold.

10. The method of claim 9, wherein the second threshold is based, in part, on a maximum quantity of unbacked up data that the client may store without violating a protection policy associated with the client.

11. The method of claim 9, wherein each of the periods of time exceed a minimum period of time.

12. The method of claim 7, wherein the future computing resource availability specifies future periods of time.

13. A non-transitory computer readable medium comprising computer readable program code, which when executed by a computer processor enables the computer processor to perform a method for providing backup services, the method comprising:
   obtaining a computing resource availability for a client;
   generating a prediction model using the computing resource availability for the client;
   predicting, using the prediction model and live data, a future computing resource availability for the client; and
   initiating generation of a backup for the client at an unscheduled time that is based, at least in part, on the future computing resource availability,
   wherein the unscheduled time is further based, at least in part, on a quantity of unbacked up data of the client reaching a threshold.

14. The non-transitory computer readable medium of claim 13, wherein the unscheduled time is further based, at least in part, on a protection policy associated with the client.

15. The non-transitory computer readable medium of claim 13, wherein the computing resource availability for the client specifies periods of time during which available computing resources of the client exceed a second threshold.

16. The non-transitory computer readable medium of claim 15, wherein the second threshold is based, in part, on a maximum quantity of unbacked up data that the client may store without violating a protection policy associated with the client.

17. The non-transitory computer readable medium of claim 15, wherein each of the periods of time exceed a minimum period of time.

* * * * *